United States Patent [19]
Jones

[11] 3,788,172
[45] Jan. 29, 1974

[54] TEAR CUTTER

[75] Inventor: William T. Jones, Barberton, Ohio

[73] Assignee: The Goodyear Tire & Rubber Company, Akron, Ohio

[22] Filed: June 26, 1972

[21] Appl. No.: 266,002

[52] U.S. Cl............................ 83/9, 83/11, 83/444, 83/449, 83/618
[51] Int. Cl........................... B26d 3/08, B26d 7/06
[58] Field of Search......... 83/1, 2, 9, 5, 11, 12, 618, 83/639, 6, 444, 449

[56] References Cited
UNITED STATES PATENTS
3,426,629   2/1969   Herzig et al. ......................... 83/9 X

*Primary Examiner*—Willie G. Abercrombie
*Attorney, Agent, or Firm*—F. W. Brunner; R. S. Washburn

[57] ABSTRACT

Apparatus for preparing a specimen of elastomeric compound for a physical test thereof in which the specimen in the form of a rectangular prism is split to provide an area subject to tearing as two portions of the prism are pulled apart by an Instron or like testing machine. A two-part fixture supports the specimen and two coplanar knives in spaced apart relation are moved longitudinally of the specimen and of the fixture to slit the narrow longitudinal edges of the prism leaving an uncut test area therebetween.

The foregoing abstract is not to be taken as limiting the invention of this application, and in order to understand the full nature and extent of the technical disclosure of this application, reference must be made to the accompanying drawing and the following detailed description.

3 Claims, 2 Drawing Figures

PATENTED JAN 29 1974 3,788,172

TEAR CUTTER

This application relates to apparatus for preparing a specimen of elastomeric compound for a physical test thereof, and particularly to an apparatus for preparing such specimen in an elastic or cured state thereof prior to a determination of the tear strength of said specimen.

BACKGROUND OF THE INVENTION

It is well known that the design of compounds of rubber and rubber-like materials including both natural and synthetic rubbers (any and all of which are herein designated by the commonly used term "rubber compound") must be balanced by some sacrifice of one or more properties to enhance other related properties. In seeking to optimize the several properties of a rubber compound in its intended use as particularly exemplified by use in automotive vehicle tires, candidate rubber compounds are subjected to numerous physical tests. One such test, designed to obtain a measure of the tear resistance of a rubber compound, is known as Instron Tear. This test has found favor over previously conventional tear tests such as the crescent tear or fatigue tear and is accomplished by utilizing a test piece which is thick and wide in relation to the section to be torn. A desired sample for the Instron Tear Test is provided from a larger cured slab one-half inch in thickness and is die-cut to provide one or more specimens in the form of a rectangular prism ½ × 1 × 6 inches. According to the test procedure, each specimen or sample is then scored or slit about 0.40 inch inward from each ½ × 6 inch surface in a cutting plane parallel to the 1 × 6 inch surface and midway of the ½ inch thickness, the scores providing a remaining uncut portion centered within the specimen which represents the width of the tear to be made. This width is specifically a 0.25 to 0.30-inch strip between the scored portions which is centered then in the specimen relatively of both the thickness and the width thereof. After the sample is scored as described to the required depth, it is also slit in the cutting plane of the score cuts at one end of the specimen to provide free ends not less than 2.25 inches in length which are then available to be clamped in the jaws of the Instron testing machine.

The free ends of the specimen are secured respectively in the jaws of the Instron tester and pulled apart at a rate of 20 inches per minute. The load in the Instron and the fluctuations thereof as the jaws are moved apart is plotted on a conventional strip chart moving at a speed of 5 inches per minute.

Despite the advantages in the practice of the Instron Tear Test briefly described above, great difficulty has been experienced in preparing such specimens accurately, rapidly, and economically.

SUMMARY OF THE INVENTION

The present invention, therefore, aims to accomplish the preparation of the described specimen accurately, quickly, and economically. A primary object is the provision of an apparatus for scoring or splitting a sample or specimen of rubber compound in the form of a rectangular prism.

The foregoing object as well as advantages and additional objects which will become apparent or be particularly pointed out as the description proceeds are accomplished in accordance with the present invention by an apparatus comprising a pair of knives, means supporting said knives in fixed coplanar opposed spaced apart relation, a specimen holder comprising an opposing pair of channels receiving the specimen therebetween, the respectively opposed flanges of said channels defining knife accommodating slits therebetween, means movable with the first said means for guiding said knives relative to said holder, and means for effecting relative movement between said holder and the first said means to slit such specimen longitudinally and outwardly of a central test area.

DRAWINGS

In the following description of an exemplary embodiment of the invention claimed herein, reference is made to the attached drawing in which:

Figure 2:
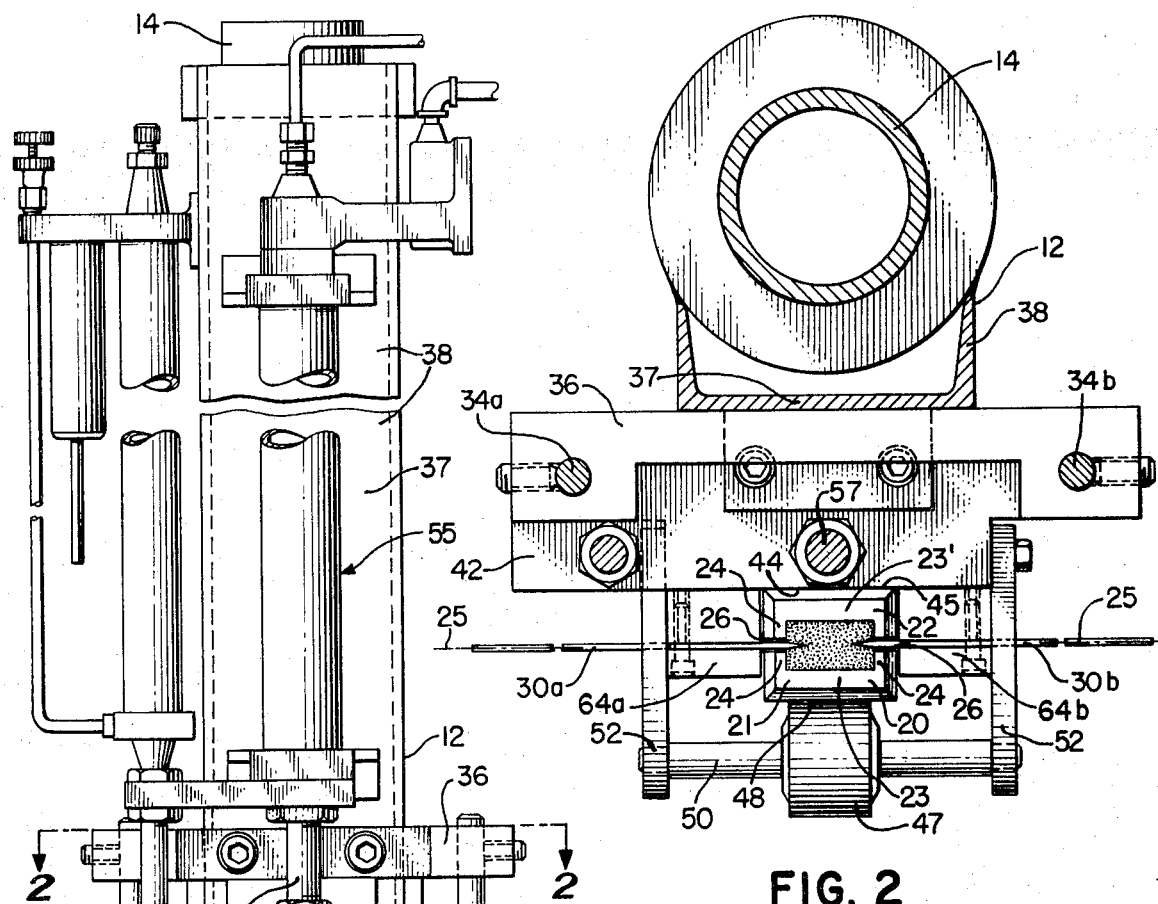
FIG. 2 is a plan view, partly in section, referred to the section line 2—2 in FIG. 1.

With reference to the drawing, an apparatus 10 according to the invention comprises a frame 12 which includes an upright column 14 and a table 16 secured to the column at a convenient working height from the floor.

A specimen holder 20 is mounted on the table 16, its base 18 being secured conventionally thereon. The holder 20 comprises a pair of channels 21,22 secured to and standing vertically from the base. The webs 23,23' of the respective channels form sidewalls, as seen in FIG. 2, while the inwardly turned flanges 24 cooperate to form end walls of a hollow rectangular prism which is bisected vertically by a cutting plane 25. The respective flanges 24 are spaced slightly apart, symmetrically with respect to the cutting plane 25, to provide elongated slits 26 accommodating respectively the slitting knives 30a,30b.

The specimen to be prepared is a rectangular prism having dimensions of ½ × 1 × 6 inches. The holder 20 is dimensioned so that the specimen slides freely longitudinally (vertically) thereof but is restrained from significant displacement laterally (horizontally). A stool 32 having slots accommodating passage of the knives 30a and 30b is disposed in the bottom of the holder 20 to elevate the specimen therein sufficiently for the knives to completely slit the entire length of the specimen.

A parallel pair of guide rods 34a,34b are secured to the base 18 and to a frame member 36 which is rigidly secured to the web 37 of a channel 38 which forms a part of the column 14 and by which the rods are held parallel to the cutting plane 25 and to the direction of movement (arrow 39) of the knives.

Figure 1:
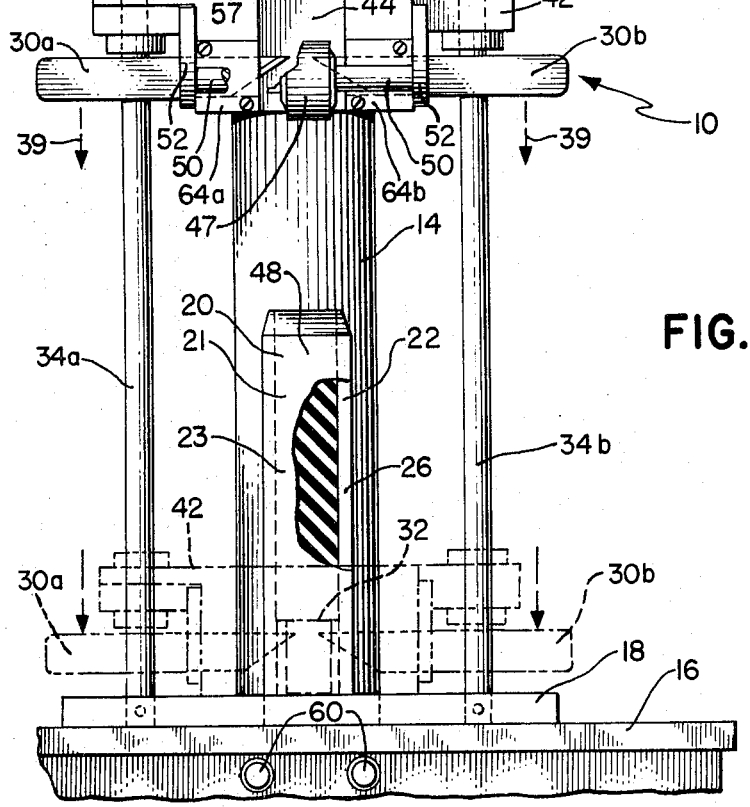
FIG. 1 is an elevation view of an apparatus according to the invention.

A crosshead 42 is mounted for movement longitudinally of the guide rods 34a,34b and vertically as seen in FIG. 1. A pair of coplanar parallel opposed knives 30a,30b are securely clamped in the crosshead 42 and project inwardly toward each other a preset distance. The space between the tips of the knives will define a central area of the specimen which remains uncut and thus establishes a width and an area which is subject to the previously discussed tear test.

It will be appreciated by persons skilled in the related arts that movement of the crosshead 42 and the knives downwardly to slit the specimen will be accompanied by a tendency of the specimen to be compressed lengthwise and to bulge laterally. In accordance with the present invention, means are provided on the crosshead for engagement with the specimen holder so as to guide the crosshead and the knives relative to the holder and the specimen therein as the knives move downwardly. In the present apparatus, support means are provided by a slider 44 fixed on the crosshead and positioned rigidly to engage the rearward exterior plane surface 45 of the holder 20 and, in the front, by a roller 47 engageable with the forward exterior plane surface 48 of the holder 20 mounted on a shaft 50 rigidly fixed in arms 52 which are in turn secured to the crosshead. The tendency of the cut in the specimen to be wavey is substantially eliminated.

To effect movement of the crosshead, the knives, and the support means, longitudinally of the specimen and the holder, a commercial air cylinder and speed control cylinder assembly 55 is mounted on the channel 38. The specific assembly used herein is a Model B801-22016 supplied by Bellows-Valvair Corporation of Akron, Ohio. The piston rod 57 of the air cylinder is secured to the crosshead 42. Conventional solenoid air valve controls are actuated by pushbuttons 60 mounted in a panel beneath the forward edge of the table 16 and energize the assembly 55 to move the crosshead 42 downwardly at a preset rate controlled by the speed control cylinder. The return stroke can be automatic or controlled by pushbutton.

The knives 30a,30b may take any form but the clamps 64 are conveniently arranged to accommodate standard commercial "mill knives," readily available to those skilled in the arts of rubber manufacture, in the apparatus 10.

In operation of the device, to prepare a sample for the described test, it is necessary only to drop the specimen into the holder 20. As previously mentioned, a specimen moves freely longitudinally of the holder and thus seats itself on the stool 32. The operator presses the start button 60 and the crosshead is moved downwardly by the air cylinder at a predetermined rate. The knives extending inwardly into the hollow prism and into the specimen traverse the slits 26 in a single stroke preparing the specimen to have an uncut central area of predetermined width. Upon the return stroke, the knives lift the specimen clear of the holder to a position to be readily grasped and removed by the operator or dropped into a tote tray. If desired, in a subsequent and additional operation, the opposed pair of knives 30a,30b can be replaced by a single knife extending into both clamps 64a,64b. Then by resetting the stroke of rod 57 in the assembly 55, in a conventional manner, the transverse previously described slit can be made to provide the free ends for attachment to the jaws of the Instron Test machine. Such additional operation becomes of particulr advantage when a considerable number of specimens are required.

While certain representative embodiments and details have been shown for the purpose of illustrating the invention, it will be apparent to those skilled in the art that various changes and modifications may be made therein without departing from the spirit or scope of the invention.

What is claimed is:

1. Apparatus for preparing a specimen of elastomeric compound for a physical test thereof, the apparatus comprising a pair of knives, means supporting said knives in fixed coplanar opposed spaced apart relation to each other, a specimen holder comprising an opposing pair of fixed channels receiving said specimen freely and in undeformed condition therebetween, the respective opposed flanges of said channels defining knife accommodating slits therebetween, means movable with the first said means for guiding said knives relative to said holder, and means for effecting relative movement between said holder and the first said means to slit such specimen longitudinally and outwardly of a central test area.

2. Apparatus for preparing a specimen of elastomeric compound for a physical test thereof, the apparatus comprising:
a fixture having a hollow, rectangular prism defined by opposed sidewalls and end walls conforming to side and end walls, respectively, of said specimen, the latter being freely movable longitudinally of said hollow prism, each sidewall of said fixture having a knife accommodating slit extending longitudinally thereof, crosshead means mounted for movement longitudinally of said fixture and having support means engageable during such movement with outer surfaces of said sidewalls, and an opposed pair of knives mounted on said crosshead to extend toward each other through the respectively associated knife slits into said hollow prism to slit such specimen longitudinally during said movement.

3. Apparatus for preparing a specimen of elastomeric compound for a physical test thereof, the apparatus comprising: a frame having a rigid column, a table secured to said column, and a parallel pair of guide rods fixed on said frame to extend upwardly of said table; a crosshead mounted slidably on said guide rods for movement parallel to a cutting plane; a specimen holder mounted on said table including an opposed parallel pair of channels defining a hollow, rectangular prism for receiving said specimen longitudinally therein disposed symmetrically of said plane, the respectively opposed flanges of said channels defining a pair of narrow, open slits extending longitudinally of said prism and in said cutting plane; a pair of knives mounted on said crosshead for movement in said cutting plane and each extending a predetermined distance toward the other in said plane; means cooperating to support said specimen holder including a slider and a roller mounted on said crosshead and respectively engageable with opposing exterior surfaces of said holder during relative movement of said crosshead and said holder; and means for effecting relative movement between said knives and said holder including an air cylinder and a speed control cylinder mounted on said column and connected to move said crosshead and said knives to slit such specimen longitudinally.

* * * * *